(12) United States Patent
Kaulgud et al.

(10) Patent No.: US 8,584,085 B2
(45) Date of Patent: Nov. 12, 2013

(54) IDENTIFICATION OF CONCEPTS IN SOFTWARE

(75) Inventors: Vikrant Kaulgud, Maharashtra (IN); Jagadeesh Chandra Bose Rantham Prabhakara, Andhra Pradesh (IN); Subramanya Prasad, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 849 days.

(21) Appl. No.: 12/565,256

(22) Filed: Sep. 23, 2009

(65) Prior Publication Data

US 2010/0077351 A1    Mar. 25, 2010

(30) Foreign Application Priority Data

Sep. 24, 2008 (IN) .......................... 2333/CHE/2008

(51) Int. Cl.
  *G06F 9/44* (2006.01)
(52) U.S. Cl.
  USPC ........................................................ 717/120
(58) Field of Classification Search
  USPC ........................................................ 717/120
  See application file for complete search history.

(56) References Cited

U.S. PATENT DOCUMENTS

| | | | | |
|---|---|---|---|---|
| 6,681,383 | B1 * | 1/2004 | Pastor et al. | 717/126 |
| 7,346,490 | B2 * | 3/2008 | Fass et al. | 704/7 |
| 7,743,312 | B2 * | 6/2010 | Choi et al. | 714/790 |
| 8,359,520 | B2 * | 1/2013 | Pietraski et al. | 714/755 |
| 8,401,891 | B2 * | 3/2013 | Macy et al. | 705/7.38 |
| 2002/0152126 | A1 * | 10/2002 | Lieu et al. | 705/26 |
| 2003/0217023 | A1 * | 11/2003 | Cui et al. | 706/45 |
| 2004/0153992 | A1 * | 8/2004 | Molina-Moreno et al. | 717/105 |
| 2005/0108554 | A1 * | 5/2005 | Rubin et al. | 713/187 |
| 2005/0166193 | A1 * | 7/2005 | Smith et al. | 717/143 |
| 2006/0101435 | A1 | 5/2006 | Akilov | |
| 2006/0253841 | A1 | 11/2006 | Rioux | |
| 2006/0277112 | A1 * | 12/2006 | Lieu et al. | 705/26 |
| 2007/0089103 | A1 * | 4/2007 | Iborra et al. | 717/141 |
| 2007/0168907 | A1 * | 7/2007 | Iborra et al. | 717/100 |
| 2008/0134135 | A1 | 6/2008 | Elaasar | |
| 2008/0155508 | A1 * | 6/2008 | Sarkar et al. | 717/126 |
| 2011/0283260 | A1 * | 11/2011 | Bucuvalas | 717/124 |

OTHER PUBLICATIONS

Molina et al. "Specifying Conceptual Interface Patterns in an Object-Oiriented Method with Automatic Code Generation", 2001, IEEE.*

(Continued)

*Primary Examiner* — Anna Deng
*Assistant Examiner* — Junchun Wu
(74) *Attorney, Agent, or Firm* — Mannava & Kang, P.C.

(57) ABSTRACT

Techniques enabling an end-user to specify complex concepts consisting of code abstractions, design abstractions and architectural abstractions in rule form are disclosed. In one embodiment, a graphical user interface is provided to guide a user through the process of entering concept specification information in order to define concepts, including the provision of one or more code snippets that are subsequently analyzed to assist the user in specifying the concept. The resulting rules or concept signatures are evaluated by a rule engine to determine the degree to which the underlying concepts are reflected in a given set of code. Recommended measures that need to be taken for transforming code to satisfy a concept may be provided subsequent to the analysis of the code. In this manner, code quality may be improved through systematic analysis of targeted code to demonstrate adherence (or non-adherence, as the case may be) to user-defined concepts.

17 Claims, 6 Drawing Sheets

(56) References Cited

OTHER PUBLICATIONS

Molina et al. "User Interface Conceptual Patterns", 2002, Technical University of Valencia Valencia, Spain.*
Deursen et al., "Identifying Objects using Cluster and Concept Analysis", 1999, ACM.*
Rajlich et al., "The Role of Concepts in Program Comprehension", 2002, IEEE.*
Marcus et al., "An Information Retrieval Approach to Concept Location in Source Code", 2004, IEEE.*

Search Report: European Patent Application No. 09171223.2; dated Jan. 26, 2010.
Reid Holmes and Gail C. Murphy, "Using Structural Context to Recommend Source Code Examples", Software Engineering, 2005, ICSE 2005, Proceedings. 27th International Conference on St. Louis, MO, USA, May 15-21, 2005, pp. 117-225, XP007909509.
Paul S. et al., A Framework for Source Code Search using program Patterns:, IEEE Transactions on Software Engineering, IEEE Service Center, Los Alamitos, CA, US, vol. 20, No. 6, Jun. 1, 1994, pp. 463-475, XP000450265.

* cited by examiner

| Author's Name | John Doe |
|---|---|
| Project Name | Software Project #1 |
| Date Of Creation | March 23, 2008 |
| Concept Name | EmptyWhileLoop |
| Concept Description | While Body Loop Should Not Be Empty |

⎫
⎬ 502
⎭

(<BACK)  (NEXT>)  (FINISH)  (CANCEL)
   504      506      508      510

| Which application tier does the concept belong? | Applications ▼ |
|---|---|
| What technology does the concept belong? | Java ▼ |
| What is the general nature of the concept? | General ▼ |
| What is the lowest granularity of code to which the concept applies? | ▼ |

Multi-Class
Class
Method
Block
Statement

⎫
⎬ 602
⎭

(<BACK)  (NEXT>)  (FINISH)  (CANCEL)

IDENTIFICATION OF CONCEPTS IN SOFTWARE

FIELD OF THE INVENTION

The instant disclosure relates to software development and, in particular, to techniques for identifying and/or analyzing concepts to improve code quality.

BACKGROUND OF THE INVENTION

Code quality is of paramount importance in a software delivery project. Bad quality not only affects the maintainability and comprehensibility of the code, it also affects the production systems in which the code is released. The impact on production systems can range from relatively hidden problems, such as non-availability of logging information (to be used for performance analyses etc.), to more overt functional defects that adversely affect an end-user's experience.

Understanding concepts constitutes a key ingredient for providing good code quality, as well as program comprehension and maintenance. Concepts can be classified into two categories: code semantic abstractions and design abstractions. Code semantic abstractions pertain to the concepts that exist solely in the code. Some examples are anti-patterns, coding idioms and abstracted task-specific coding methods such as XML parsing. Design abstractions concern patterns that offer good solutions to recurring program design problems, i.e., that result in code that exhibits good quality, reusability and maintainability. Recognizing occurrences of design patterns in source code assists in recovering the implicit low-level design of the software system.

Tools currently exist that perform concept specification and extraction at the code or compiler level. Some examples of widely used tools are: CheckStyle, PMD and Findbugs. These tools suffer from a number of limitations. For example, most current tools are equipped with a pre-defined, non-configurable (at least by the user) knowledge base for use in detecting concepts (or violations thereof) in a software project. Simple mechanisms do not exists for enriching the knowledge base.

Furthermore, most of the existing tools capture concepts pertaining to a particular language/technology and do not capture them at the design, architecture and application-domain level, i.e., at higher levels of abstraction. Additionally, most tools fail to capture concept violations that exist across different components. Further still, most tools provide a report of concept violations, i.e., where the standards or principles associated with the concept are not followed. However, such tools fail to indicate the impact of a violation on the software or to specify what actions can the user take to rectify such violations.

Improvement to such tools would represent a significant advancement of the art.

SUMMARY OF THE INVENTION

The instant disclosure describes techniques enabling an end-user to specify complex concepts consisting of code abstractions, design abstractions and architectural abstractions in rule form, thereby allowing the detection of concepts (or violations thereof) in software code, for example, either source code or object code. The detection/violation of concepts may be used to assist an end-user in code comprehension, code-quality enforcement and code-transformation when attempting to meet quality standards. Concepts can be defined in either a "negative" or "positive" sense, depending on the nature of the concept and, depending on the definition of the concept, either the detection or violation of the concept can be indicative of code quality.

To this end, the present invention provides for the definition of new concepts and/or the reconfiguration of previously defined concepts, particularly those concepts having specific applicability to a given project. This is achieved, in one embodiment, through use of a graphical user interface in which a user is guided through the process of entering concept specification information in order to define concepts. This process is facilitated by allowing the user to specify one or more code snippets that are subsequently analyzed to assist the user in specifying the concept. Resulting rules may then be used, in conjunction with a suitable rule engine, to determine the degree to which the underlying concepts are reflected in a given set of code. Additionally, concept identification information may be obtained via the graphical user interface, thereby facilitating greater sharing of concept specifications and their use across multiple projects.

Using such techniques, application-level concepts, e.g., financial services, communications, etc., can be defined as well. For example, concepts such as "All Credit Card Transaction Mangers Objects should not instantiated multiple times" are possible to define. The result is a concept definition that can be shared across projects of a particular application domain. Further still, to the extent that the instant approach de-links the concept specification and code analysis parts, the techniques described herein facilitate the analysis of the entire software system and gather information pertaining to all objects of the code.

In one embodiment, recommended measures that need to be taken for transforming code to satisfy a concept may be provided subsequent to the analysis of the code. For example, if a concept is not implemented properly, the user is guided through a sequential series of steps for transforming the code such that the code better matches the concept definition, thereby ensuring greater consistency and adherence to good coding practices across the entire body of code.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

FIGS. 5-9 illustrate various portions of a graphical user interface that may be employed when implementing the techniques described herein.

DETAILED DESCRIPTION OF THE PRESENT EMBODIMENTS

Figure 1:
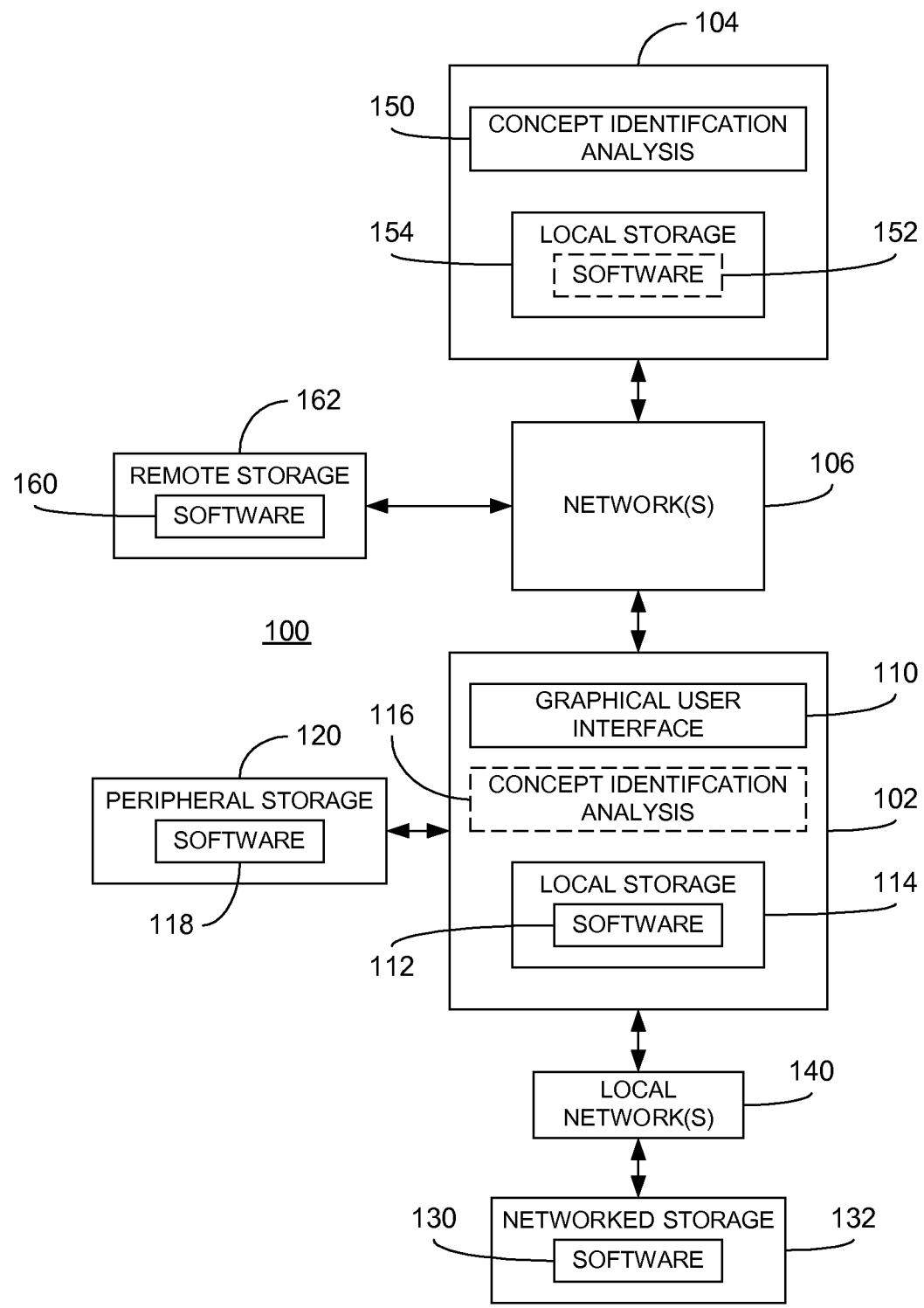
FIG. 1 is a block diagram of a system to which the techniques described herein may be beneficially applied.

Referring now to FIG. 1 a system 100 is illustrated comprising a first computing device 102 in communication with a second computing device 104 via one or more intervening networks 106. In the illustrated embodiment, the first computing device 102 may comprise an end-user terminal such as a desktop/laptop/handheld computer or the like, whereas the second computing device 104 may comprise a server computer or the like. This distinction is manifested in the illustrated example through the provision of a graphical user interface (GUI) 110 as part of the first computing device 102. Implementation of graphical user interfaces are well known in the art and further explanation in this regard is not required. The network(s) 106 may comprise a public network (e.g., the Internet, World Wide Web, etc.) or private network (e.g., local area network (LAN), etc.) or combinations thereof (e.g., a virtual private network, LAN connected to the Internet, etc.). Furthermore, the network 106 need not be a wired network only, and may comprise wireless network elements as known in the art.

The system 100 may incorporate the concept specification and analysis techniques described herein in any of a number of ways, as shown. In one embodiment, described in greater detail below, the graphical user interface 110 may be employed to specify various concepts in the forms of rules that may be assessed against target software code using a suitable rule engine. As represented by the concept identification analysis block 150, the rules defined in this manner may be sent to the second computing device 104, where they are subsequently stored and assessed by a rule engine against targeted software code, which may be stored in any of a number of locations. For example, the first computing device may comprise local storage 114 having the software code 112 to be analyzed stored thereon. In this case, in addition to receiving the rules defined via the GUI 110, the second computing device 104 may also receive the software 112 to be analyzed and temporarily store it 152 in its own local storage 154 during the analysis phase. Any results obtained using the second computing device 104 may be subsequently transmitted back to the first computing device 102 for presentation to the user.

Alternatively, the software 118 to be analyzed may be obtained from peripheral storage 120 (e.g., external hard drives, optical or magnetic drives, etc.) associated with the first computing device 102 and sent to the second computing device 104 in a similar manner. Furthermore, the first computing device 102 may be in communication with locally networked storage 132 having stored thereon the software 130 to be analyzed. Further still, the software 160 may be stored in remote storage 162 that is accessible through the use of a suitable network address, as known in the art. In this latter embodiment, rather than directly sending the second computing device 104 the software 160 to be analyzed, a suitable network address is provided by the first computing device 102 and employed by the second computing device to access the targeted software 160. As these non-exhaustive examples illustrate, the instant disclosure is not limited in the manner in which the software to be analyzed is stored and/or provided to the concept identification analysis block 150.

An advantage of providing a server-based approach to implementing the concept identification analysis 150 is that the analysis service may be made broadly available to any of a number of users having access (assuming, of course, the necessary user permissions, authentications, etc.) to the second processing device 104 via the network(s) 106 and associated user terminals (not shown). In an alternative embodiment, however, the concept identification analysis 116 may be locally implemented on the same device used to define the rules, i.e., the first computing device 102. An advantage of this approach is that need to communicate both the rules and the targeted software to the second computing device 104 is eliminated, thereby increasing speed and efficiency. However, it is understood that in this implementation, rules defined and/or stored elsewhere (i.e., not by the first computing device 102) may be received and employed by the first computing device 102 in a manner similar to that described in the prior embodiment. In short, once defined in accordance with the techniques described herein, rules for identifying concepts may be shared across platforms for use in concept identification analysis.

Figure 2:
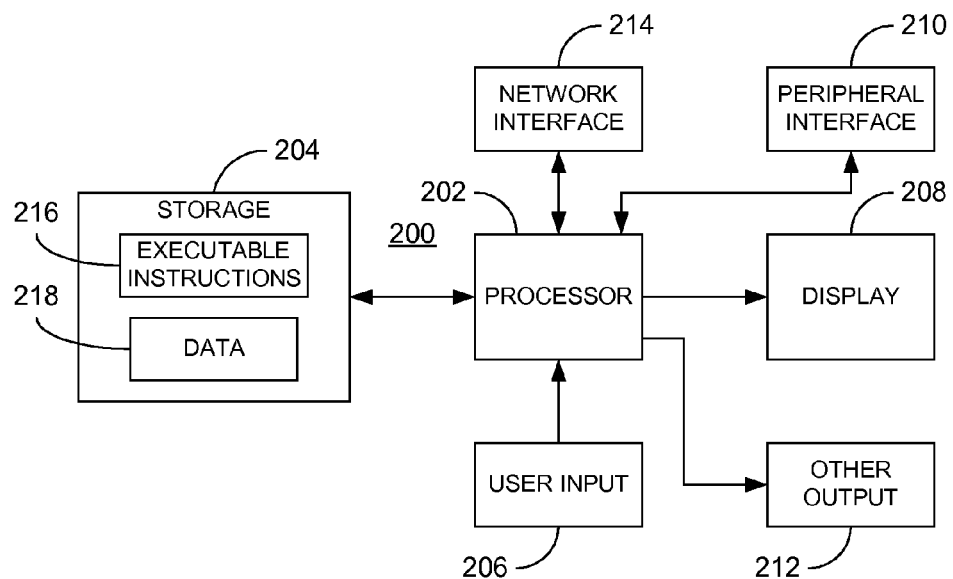
FIG. 2 is a block diagram of an exemplary device that may be used to implement the techniques described herein.

Referring now to FIG. 2, an exemplary device 200 that may be used to implement the present invention is further illustrated. With reference once again to FIG. 1, the device 200 may be used to implement, for example, the first computing device 102. Regardless, the device 200 comprises a processor 202 coupled to a storage component 204. The storage component 204, in turn, comprises stored executable instructions 216 and data 218. In a preferred embodiment, the processor 202 may comprise one or more processing devices such as a microprocessor, microcontroller, digital signal processor, or combinations thereof capable of executing the stored instructions 216 and operating upon the stored data 218. Likewise, the storage 204 may comprise one or more devices such as volatile or nonvolatile memory including but not limited to random access memory (RAM) or read only memory (ROM). Processor and storage arrangements of the types illustrated in FIG. 2 are well known to those having ordinary skill in the art. In a presently preferred embodiment, the processing techniques described herein are implemented as a combination of executable instructions and data within the storage component 204.

In a presently preferred embodiment, the device 200 may comprise one or more user input devices 206, a display 208, a peripheral interface 210, other output devices 212 and a network interface 214 all in communication with the processor 202. The user input device 206 may comprise any mechanism for providing user input to the processor 202. For example, the user input device 206 may comprise a keyboard, a mouse, a touch screen, microphone and suitable voice recognition application or any other means whereby a user of the device 200 may provide input data to the processor 202. The display 208, may comprise any conventional display mechanism such as a cathode ray tube (CRT), flat panel display, or any other display mechanism known to those having ordinary skill in the art. The peripheral interface 210 may include the necessary hardware, firmware and/or software necessary to communication with various peripheral devices, such as media drives (e.g., magnetic disk or optical disk drives) or any other source of input used in connection with the instant techniques. Likewise, the other output devices 212 may optionally comprise similar media drive mechanisms as well as other devices capable of providing information to a user of the device 200, such as speakers, LEDs, tactile outputs, etc. Finally, the network interface 214 may comprise hardware, firmware and/or software that allows the processor 202 to communicate with other devices via wired or wireless networks, as known in the art.

While the device 200 has been described as a preferred form for implementing the techniques described herein, those having ordinary skill in the art will appreciate that other, functionally equivalent techniques may be equally employed. For example, as known in the art, some or all of the executable instruction-implemented functionality may be implemented using firmware and/or hardware devices such as application specific integrated circuits (ASICs), programmable logic arrays, state machines, etc. Further still, other implementation of the device 200 may include a greater or lesser number of components than those illustrated. For example, when used to implement the second computing device 104, the device 200 may not include the display 208 or user inputs 206. Once again, those of ordinary skill in the art will appreciate the wide number of variations that may be used is this manner.

Figure 3:
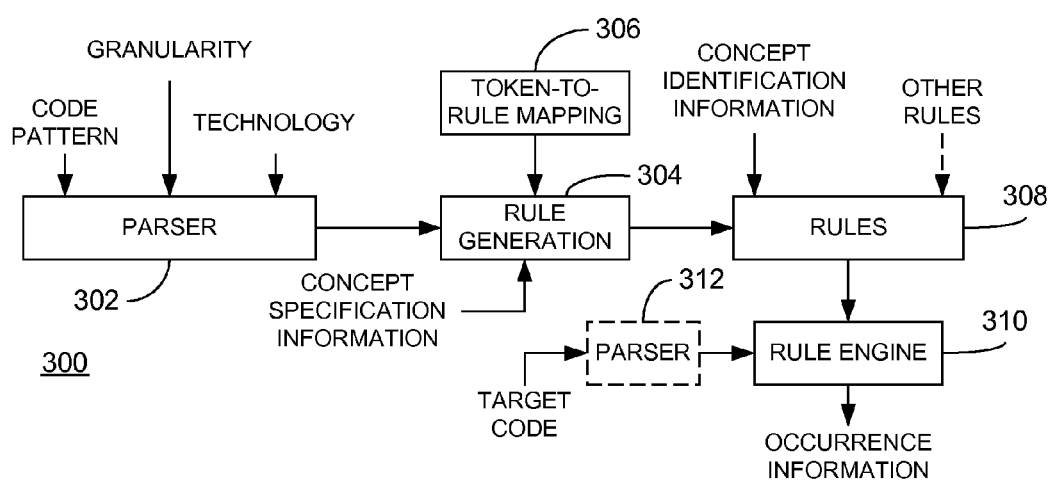
FIG. 3 is a block diagram of an apparatus for defining rules and identifying concepts in software based on such rules in accordance with the instant disclosure.

Referring now to FIG. 3, an apparatus 300 for apparatus for defining rules and identifying concepts in software is further described. The apparatus 300 may be implemented using suitable executable instructions being executed by one or more processing devices, as described above relative to FIG. 2, or through the use of suitable hardware, or hardware and software components as known in the art.

In the illustrated embodiment, the apparatus 300 comprises a parser 302 in communication with a rule generator 304. As shown, the parser 302 may receive a code pattern (or, as it is sometimes referred to, a code snippet) provided by a user when defining a concept. In various preferred embodiments described below, the illustrated inputs to the parser 302 are provided by the use via a graphical user interface. As known in the art, a parser 302 analyzes input strings, presumably written in a underlying coding language, to identify tokens having specific semantics in the coding language. A code pattern may comprise any length of source code (from a single line of source code to a large number of source code expressions) useful in defining the concept. Although the instant description generally describes embodiments related to the use of source code, it is understood that the techniques described herein may be equally applied to object code. Additionally, a granularity or abstraction level indication is also provided by the user. The granularity indication serves to define the scope of the concept relative to meaningful levels of abstraction within the underlying code grammar/syntax. For example, in an object oriented programming (OOP) language, abstractions such as "block", "method" or "class" may be used to specify the granularity of the concept. In this example, a "class" granularity would be broader in scope than a "method" granularity. Furthermore, a technology indication is provided to the parser 302, as shown. The technology indication, which may comprise an indication of the specific language employed in the code patterns, is used by the parser 302 to understand how to parse the code pattern. That is, where the technology indication corresponds to, for example, a first coding language, the parser 302 will be configured to recognize tokens specific to the first coding language, whereas it would be configured to recognize potentially different tokens applicable to a second coding language when the technology indicator corresponds to the second coding language.

The tokens output by the parser 302 are provided to the rule generator 304 that, in response to the received tokens, generates various rules that may used when analyzing targeted code to identify the inclusion (or lack thereof) of the underlying concept. To this end, the rule generator 304 may employ a token-to-rule mapping 306. The mapping 306, which may be in the form of a suitable table, maps tokens or groups of tokens to specific, configurable rules in a format that may be employed by a rule inference engine. As a relatively simple example, a token indicative of a WHILE loop in a particular coding language can map to a corresponding rule template having various configurable properties applicable to such WHILE loops. Continuing with this example, it is known that a property of a WHILE loop is that it should comprise a body that may be empty or comprise further tokens. This property of a WHILE loop may then be used as a user-defined condition, i.e., body empty or body not empty. The property-value information used to define this condition may be included in the concept specification information provided to the rule generator 304. As before, the concept specification information illustrated in FIG. 3 may be received from the user via a graphical user interface, as described in greater detail below.

Furthermore, each rule need not be based solely on a single token, as in the previous example. Rather, multiple tokens, and their respective user-configurable conditions, may be combined into more complex rules. Building on the previous example, conditional rules based on the tokens found in the body of the WHILE loop may be defined for a more complex concept. Further still, it is possible to augment concept specification with multi-location pattern definition. In this formulation, a concept doesn't need to be confined to a concept existing within a single location, e.g., a specific object in OOP terms, and instead may be assessed on properties attributable to multiple locations, e.g., different objects. In this case, each code snippet allows definition of a partial concept, which may be subsequently combined to form a rule corresponding to a top-level or overall concept.

The fully configured rules output by the rule generator 304 are subsequently stored in a rule storage component 308. As mentioned with respect to FIG. 1, the rule storage component 308 may reside in any of a number of locations including, but not limited to, user terminals employed to create the rules or in network-based server computers. Those of ordinary skill in the art will appreciate that still other implementations for the rule storage component 308 are possible. As schematically illustrated in FIG. 3, the rule storage component 308 receives concept description information to be associated with each rule. The concept description information may comprise a variety of different information types, as described in greater detail below, that allows different rules to be classified, sorted, referenced, etc. according to their underlying concepts such that re-use of rules is facilitated. As those having ordinary skill in the art will appreciate, although the concept identification information is illustrated being provided to the rule storage component 308 for association with respective rules, in practice, the concept identification information may be equally provided to other components for this purpose, such as the rule generator 304, and the instant disclosure is not necessarily limited in this regard.

As further shown, the rule storage component 308 may optionally receive other rules from other sources (not shown). For example, rules generated or stored offline by remote devices may be received subsequent to their creation. Once again, centralized storage of rules through the rule storage component 308 facilitate distribution and re-use of rules. For example, rules created for a particular project may have relevance to subsequent, related projects.

As further shown, the apparatus 300 may include a rule engine 310 in communication with the rule storage component 308. In a presently preferred embodiment, the rule engine is implemented as stored instructions executed by one or more processing devices, as known in the art. Thus, when using the rule engine 310 to identify concepts in targeted code, a instance of the rule engine is first generated. The rules corresponding to the defined concepts are loaded into the rule engine. The target code to be queried for concept existence is parsed using a second parser 312, shown in FIG. 3 in dotted-line form to illustrate an embodiment where the parser for the target code is implemented apart from the apparatus 300. The meta-information (e.g., tokens) available from the parsed code is used to populate working memory of the rule engine 310.

Along with the parsed code information, other meta-information regarding the application-domain concepts, code metrics and architecture and design guidelines is loaded into the working memory. Application-domain concepts are simply rules having particular applicability to a project or domain.

For example, in the context of a project concerning financial transaction processing, an application domain concept may be expressed as "All Transaction Managers will be instantiated once." Code metrics are structural metrics such as McCabe's complexity, Response for Class, etc. indicative of code quality. For example, a concept using code metrics could be expressed as "A class having complexity above 100 should have coverage above 75". Architecture and design guidelines are concepts defined in architecture and software design documents. Example of rules of this type could include "A class in the Business Tier should not call a class in the Data Tier directly" or "A method in a class in Business Tier should cast exceptions into BusinessTierException".

As known in the art, the process of populating the working memory of the rule engine is referred to as fact assertion and is typically done using objects. An object contains meta-information extracted from code by the code parser, generated by tools such as metrics tools and the meta-information regarding architecture and design provided by the user. Once, all the meta-information regarding the target code is populated, a rule inference mechanism of the rule engine attempts to find matches between the asserted facts the rules. As further known in the art, the rule inference mechanism may employ forward chaining, in which the rule inference mechanism compares the antecedents of each rule against the asserted facts and, if a match is found, adds the consequent of each rule to the asserted facts, i.e., the rule is satisfied if its conditions are met. Alternatively, the rule inference mechanism may employ backward chaining in which it first attempts to match the consequent of each rule and, when such a match is found, further attempts to find a match to the antecedent of the matched rule, i.e., if the goal of the rule is found, the rule is satisfied if its conditional statement is also found. Regardless of the mechanism employed, after all concept rules have been checked, all rules/concepts that have been satisfied can be reported to the user as shown by the illustrated occurrence information.

Figure 4:
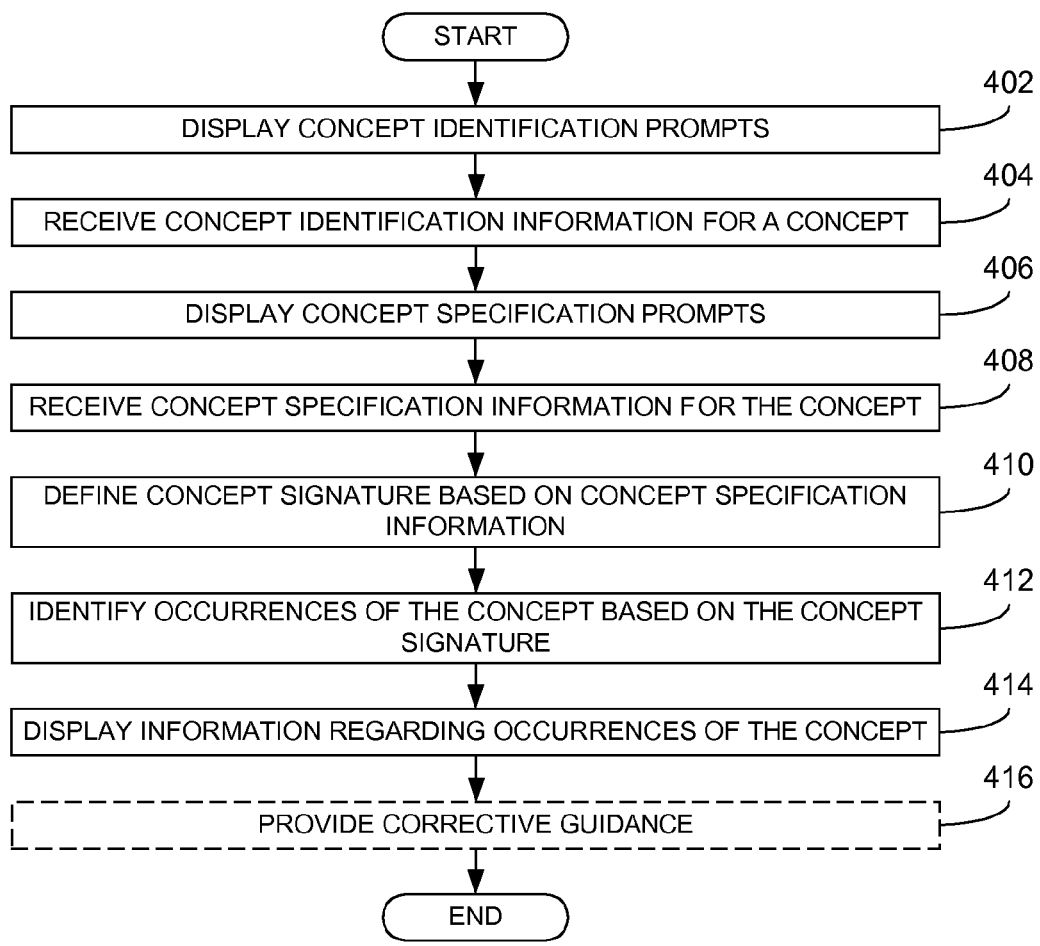
FIG. 4 is a flowchart illustrating processing in accordance with techniques described herein.

Referring now to FIG. 4, processing in accordance with one embodiment is described in further detail. In particular, FIG. 4 (in conjunction with the examples set forth in FIGS. 5-9) illustrates a method for specifying a concept via a graphical user interface and analyzing targeted code based on such rules. In a presently preferred embodiment, the processing illustrated in FIG. 4 is implemented using stored instructions executed by one or more suitable processing devices, as described above. However, it is understood that other hardware or combined hardware/software implementation techniques may be equally employed as a matter of design choice. Regardless, processing begins at block 402 where one or more concept identification prompts are displayed on a display device (e.g., display 208). As part of the graphical user interface, the concept identification prompts solicit inputs from a user that are useful in describing the concept. Examples of this are illustrated in FIGS. 5 and 6. In FIG. 5, a screen 500 comprises a plurality of concept identification prompts 502. Here, the prompts 502 include text input boxes allowing for the entry of an author's name for the concept, a project name to be associated with the concept, a date of creation of the concept specification, a concept name and a concept description. The user inputs entered in response to the prompts 502 is useful in cataloging concepts. Note that the graphical user interface includes navigation buttons 504-510 that allow a user to go back and forth between screens 504, 506, save (finish) the information entered for the concept 508 or cancel 510, as known in the art.

A further example is illustrated in FIG. 6, where a screen 600 comprises additional concept identification prompts 602. In this example, rather than text input boxes, the prompts 602 comprise drop down lists. As shown, each pull down menu list various options for indicating the application tier to which the concept applies such as business presentation, data, etc.; the technology (coding language) in which the concept is expressed; the nature of the concept such as performance, architecture, domain concept or structural quality; and the granularity (or level of abstraction, as described above) applicable to the concept. The user inputs entered in response to these prompts 602 is useful in correlating and searching concepts.

Referring once again to FIG. 4, in response to the display of the concept identification prompts, processing continues at block 404 where the concept identification information is received, as described above. Once again, various input mechanisms (e.g., text boxes, pull down lists, list boxes, radio buttons, etc.) may be used for this purpose. Note that, although blocks 402 and 404 are displayed first in the illustrated flow chart, those having ordinary skill in the art will appreciate that other ordering (e.g., after entry of the concept specification information, described below) may be equally employed.

Figure 7:
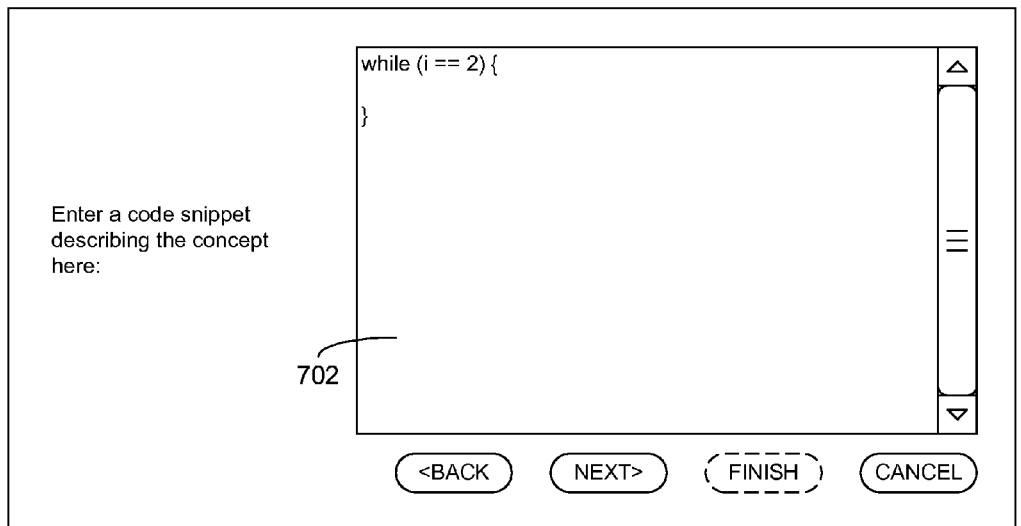
Figure 8:
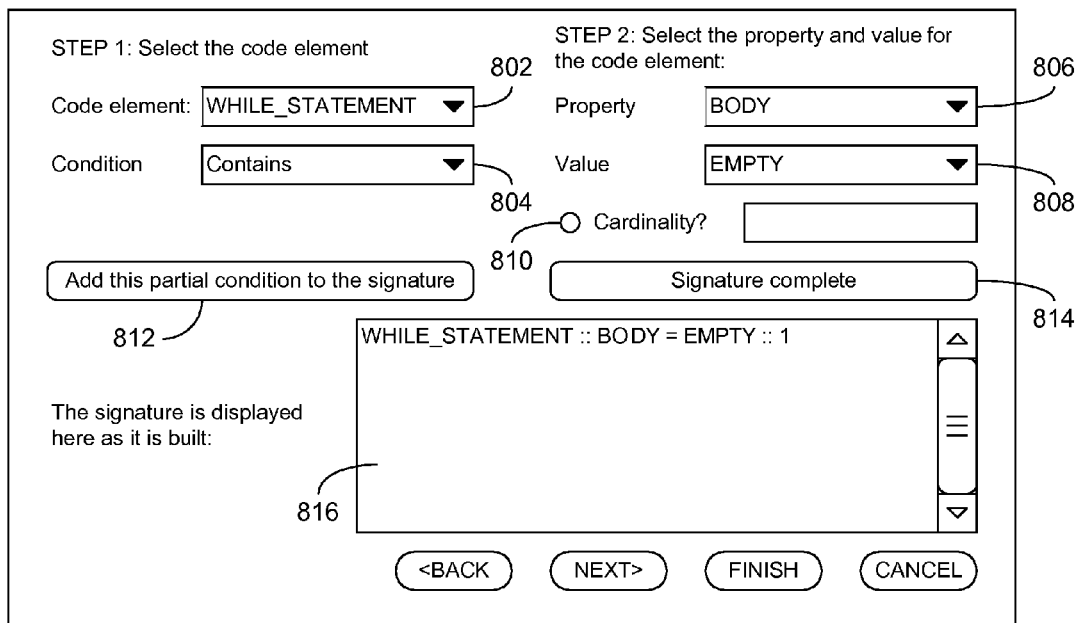

Thereafter, at block 406, one or more concept specification prompts may be displayed and, in response at block 408, concept specification information may be received from the user that is used, at block 410, to define or specify the concept signature (or rule). As part of the graphical user interface, the concept specification prompts solicit inputs from a user that are useful in specifying the various properties concept. Collectively, these properties of the concept are used to define a rule that allow the existence of a concept in targeted code to be identified. Examples of this are illustrated in FIGS. 7 and 8. In FIG. 7, a screen 700 comprises a text box 702 that allows a user to enter a code snippet (in a format compatible with the previously specified coding language) useful in specifying the concept. As illustrated in FIG. 7, the example code snippet or pattern comprises and empty WHILE loop. As described above relative to FIG. 3, the code snippet may be parsed and the resulting parsed code provided to a rule generator in order to generate a configurable rule pertinent to the defined concept. An example of an additional interface useful for further configuring a rule is illustrated in FIG. 8.

As shown in FIG. 8, a screen 800 is provided with a number of user input mechanisms 802-816 that facilitate definition of a concept signature. A first pull down list 802 is provided that allows a user to specify a particular code element. In this example, parsing of the previously supplied code snippet (see FIG. 7) provides the data that may be used to pre-configure this input mechanism, i.e., the WHILE loop from the code snippet (being the only code element of significance) results in the input mechanism 802 being pre-configured as shown. If more than one option is available as a result of the parsed code snippet, then the user simply operates the input 802 to select one of the identified options. As noted previously, each code element may have associated with it various user configurable conditions. User configuration of such conditions is provided through a second input mechanism 804. Note that the available options through the second input mechanism 804 will depend on the particular code element selected via the first input mechanism 802, i.e., it is context dependent. In the illustrated example, the "Contains" condition is selected, i.e., the concept is at least partially defined at this point by a WHILE loop that contains something.

Figure 9:
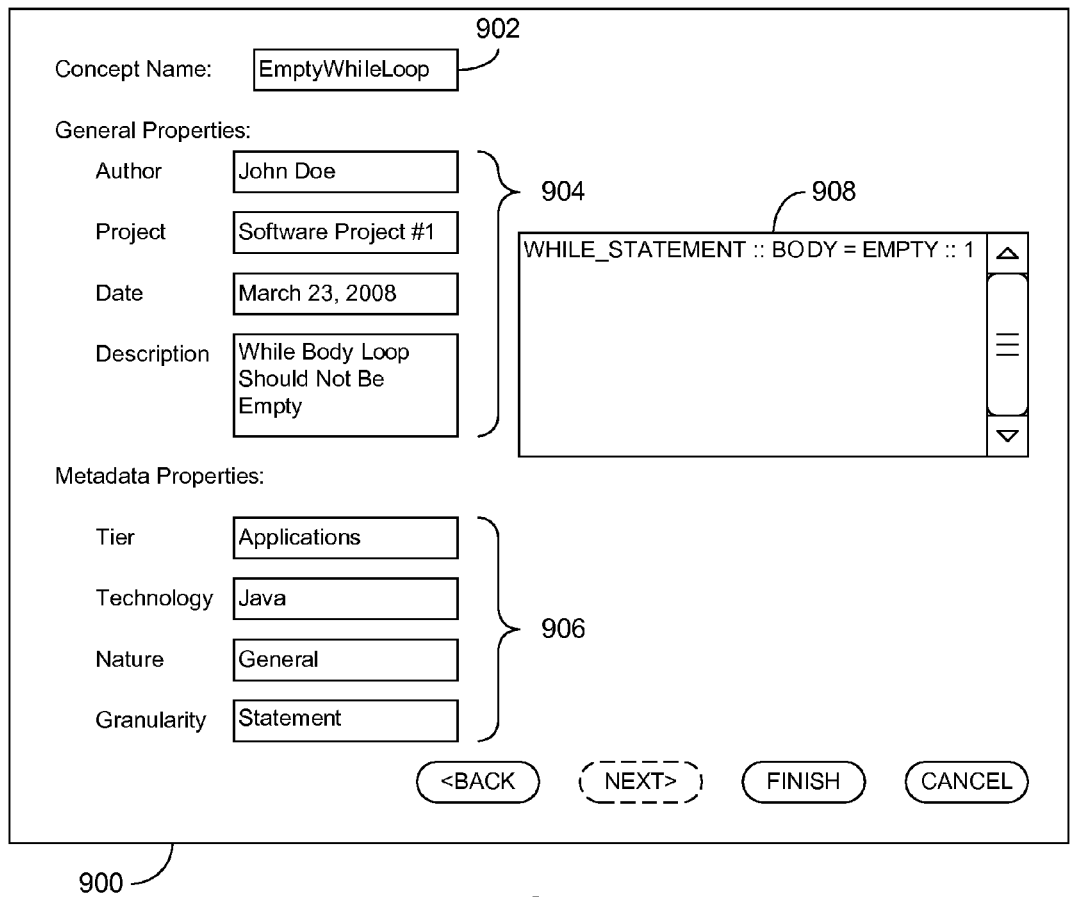

As further shown, having selected a code element and defined a condition applicable thereto, the user may select a particular property and value thereof via third and fourth input mechanisms 806, 808, respectively. Once again, pull down lists may be employed for this purpose. In the illustrated example, the selected property of the code element is the "Body" and its value is selected as "Empty". Thus, the concept as defined at this point concerns WHILE loops that contain empty bodies. Although not activated in connection with the described example, a cardinality radio button 810 and associated text box is also provided. Cardinality refers to a numeric condition that has to be met for a property-value pair. For example, in the condition "CLASS::METHOD=public::10", the cardinality is 10 and the condition tests whether the CLASS has 10 or more public Methods. Regardless, the partial conditions developed in this manner may be added to the concept signature via the first button 812, which subsequently causes the signature (as currently defined) to be displayed in a text box 816. Addition of the partial condition in this manner causes the input mechanisms 802-814 to be reset, thereby facilitating entry of an additional partial conditions. Once the signature has been completed, a second button 814 may be selected causing a summary screen 900, as shown in FIG. 9, to be provided. As shown, the concept name 902, categorization (general) properties 904, classification (metadata) properties 906 and the concept signature 908 are illustrated. If review of the summary data indicates that further revisions are required, the user can select the "Back" button 504 to go to the relevant screen and modify the content. Because the state of the signature is updated as it is created/modified, after making a change, the user can simply press the "Next" button 506 as necessary to arrive at the summary screen. Assuming that no further revisions are necessary to define the concept, the user can select the "Finish" button 508 thereby causing the signature to be translated into a form suitable for use by a rule engine, as described above, and saved (e.g., stored in the rule storage component 308) for subsequent use.

Although not illustrated in the Figures, one or more additional input screens may be provided that allow a concept user to include, along with the concept specification information, corrective advice. This is particularly applicable to those situations in which a concept is defined in a negative sense, i.e., defined in such a way that a problem in the code is detected. The corrective advice may include recommendations concerning how to eliminate the problem encompassed by the concept. Thus, when the concept is identified in targeted code, the corrective advice may be provided to the user allowing him/her to quickly fix the problem.

Continuing with FIG. 4, once the concept signature has been fully defined, processing continues at block 412 where occurrences of the concept, if any, are identified in the target code based on the concept signature using, for example, the rule inference engine described above. In one embodiment, the rules to be evaluated against targeted code are selected on a project basis. That is, when defined, certain rules are identified as being associated with a certain project, as described above (see, e.g., FIG. 5). When the code for a given project is selected for concept identification analysis, all rules associated with that project are evaluated by the rule engine against the target code for selected project. Alternatively, input mechanisms (e.g., pull down menus, etc.) could be provided that allow a user to specify only a subset of the rules associated with the project. Further still, specific rules could be indexed not only by their association with a given project, but by any of the concept identification information described above. Thereafter, at block 414, information concerning the occurrence of concepts in the targeted code may be displayed to the user according to any useful format. In a presently preferred embodiment, the occurrence information provided by the rule engine is initially stored as an Extensible Markup Language (XML) document. Thereafter, using any suitable XML transformation language, the occurrence information may be displayed as desired.

Optionally, at block 416, corrective guidance may be provided in light of the identified concepts, particularly those that are defined in a negative sense, i.e., concepts to be avoided. To this end, detailed guidance may be provided in any suitable format (e.g., using a so-called "wizard" user interface element where the user is presented with a sequence of dialog boxes to lead the user through a series of steps needed to take corrective action). For example, in an OOP project, when the user chooses a class in the project and a design-pattern concept, say, "singleton", the system analyzes the chosen class based on this concept and recommends what additional things need to be done for the chosen class to satisfy the chosen concept. For example, in this case, the system would recommend that the identified class needs to have a private constructor or a data member of the type of the chosen class. As another OOP example, if the user chooses a class and an anti-pattern concept, "no logging framework", the system recommend that the user to create an object of type 'logger' in any class satisfying this anti-pattern concept. As yet another OOP example, if the user chooses a class and an anti-pattern concept, "too many reflection calls", the system recommends the user to replace the reflection calls with non-reflection equivalents or to reduce the number of such reflection call occurrences by highlighting all the occurrences in the code corresponding to the identified class. Those having ordinary skill in the art will appreciate that these are merely examples of a wide variety of corrective guidance that may be provided in accordance with the present disclosure.

As described above, the instant disclosure describes techniques that provide a user great flexibility in the specification of concepts, and subsequent identification of such concepts, in targeted software. In an embodiment, this is achieved through the use of a graphical user interface through which a user is able to enter concept specification (and identification) information using a variety of input mechanisms, including representative code patterns or snippets. Furthermore, upon detecting the occurrence of given concepts in the targeted code, corrective guidance specifically tailored to the identified concept may be provided to the user, thereby improving the likelihood that the code will possess the desired level of quality. For at least these reasons, the above-described techniques represent an advancement over prior art teachings.

While particular preferred embodiments have been shown and described, those skilled in the art will appreciate that changes and modifications may be made without departing from the instant teachings. For example, while the use of a graphical user interface has been described herein, those having ordinary skill in the art will appreciate that other data input techniques may be employed when specifying a concept. For example, a domain specification language (DSL) may be used for this purpose. That is, instead of using a graphical user interface as described above, a user may specify the concept using an English-like language that is subsequently transformed into the desired rule. To illustrate, an anti-pattern relating to the use of a logging framework may be defined as in the following example:

```
Class That_has {
    NO $loggingFramework
}
```

In this example, semantics of the pattern variable $loggingFramework can be specified as follows:

```
$loggingFramework is{
    Object OF_TYPE Logger
}
```

Combing these two, the anti-pattern concept concerns any class that does not have an object of type Logger. Here, with reference again to FIG. 3, a component similar to the parser 302 accepts the English-like description and provides it to the rule generator 304. An appropriate mapping mechanism, similar to the token-to-rule mapping 306, will convert the English-like definition to the rule inference mechanism language in a similar fashion. In this manner, more direct specification of concepts may be undertaken.

It is therefore contemplated that any and all modifications, variations or equivalents of the above-described teachings fall within the scope of the basic underlying principles disclosed above and claimed herein.

What is claimed is:

1. In a computing device comprising a graphical user interface having at least one user input device, a method for concept identification in software, the method comprising:
    displaying, via the graphical user interface, concept specification prompts;
    receiving, via the at least one user input device based on the concept specification prompts, concept specification information corresponding to a concept, the concept comprising at least one of code abstraction, design abstraction, and architectural abstraction, the concept specification information comprising a code pattern illustrating the concept, and the code pattern including a predetermined length of source code or object code that defines the concept;
    parsing, by the computing device, the code pattern to identify at least one token;
    generating, by the computing device, at least one rule based on the at least one token and according to a mapping;
    identifying, by the computing device, occurrence of the concept in a code listing based on the at least one rule; and
    displaying, via the graphical user interface, information regarding the occurrence of the concept in the code listing as an indication of quality of the code listing, the displayed information comprising at least one of information concerning presence of the concept in the code listing and information concerning absence of the concept in the code listing.

2. The method of claim 1, wherein the concept specification information further comprises an indication of an abstraction level applicable to the concept.

3. The method of claim 1, wherein the concept specification information further comprises conditional property-value information applicable to each of the at least one token.

4. The method of claim 1, further comprising:
    displaying, via the graphical user interface, concept identification prompts; and
    receiving, via the at least one user input device based on the concept identification prompts, concept identification information corresponding to the concept.

5. The method of claim 4, wherein the concept identification information further comprises a coding language identification, and wherein the concept specification prompts are based, at least in part, upon the coding language identification.

6. The method of claim 1, wherein the code listing resides locally with the computing device.

7. The method of claim 1, wherein the code listing resides remotely relative to the computing device and is accessed by the computing device via at least one intervening network.

8. The method of claim 1, further comprising:
    recommending measures to transform the code listing to satisfy the concept.

9. The method of claim 2, wherein the abstraction level applicable to the concept includes separation into block, method, and class abstractions.

10. The method of claim 1, wherein parsing, by the computing device, the code pattern to identify the at least one token further comprises:
    receiving a technology indication specific to the code pattern; and
    parsing, by the computing device, the code pattern based on the technology indication to identify the at least one token.

11. The method of claim 1, further comprising:
    augmenting the concept specification information with a multi-location pattern definition such that the code pattern provides for definition of a partial concept of the concept.

12. The method of claim 1, further comprising:
    using the parsed code pattern to pre-configure an input mechanism to define the at least one rule.

13. The method of claim 12, further comprising:
    receiving selection of a code element of the code pattern using the input mechanism; and
    receiving selection of a property of the code element.

14. A non-transitory computer readable medium having stored thereon machine readable instructions for facilitating concept identification in software, the machine readable instructions when executed cause a computer system to:
    display concept specification prompts;
    receive, based on the concept specification prompts, concept specification information corresponding to a concept, the concept comprising at least one of code abstraction, design abstraction, and architectural abstraction, the concept specification information comprising a code pattern illustrating the concept, and the code pattern including a predetermined length of source code or object code that defines the concept;
    parse, by a processor, the code pattern to identify at least one token;
    generate at least one rule based on the at least one token and according to a mapping;
    identify, based on the at least one rule, occurrence of the concept in a code listing; and
    display information regarding the occurrence of the concept in the code listing as an indication of quality of the code listing, the displayed information comprising at least one of information concerning presence of the concept in the code listing and information concerning absence of the concept in the code listing.

15. An apparatus for concept identification in software, comprising:

a processing device;

a graphical user interface and user input device operatively connected to the processing device; and a storage component, operatively connected to the processing device, having stored thereon executable instructions that, when executed by the processing device, cause the processing device to:

display, via the graphical user interface, concept specification prompts;

receive, via the at least one user input device based on the concept specification prompts, concept specification information corresponding to a concept, the concept comprising at least one of code abstraction, design abstraction, and architectural abstraction, the concept specification information comprising a code pattern illustrating the concept, and the code pattern including a predetermined length of source code or object code that defines the concept;

parse the code pattern to identify at least one token;

generate at least one rule based on the at least one token and according to a mapping;

identify occurrence of the concept in a code listing based on the at least one rule; and display, via the graphical user interface, information regarding the occurrence of the concept in the code listing as an indication of quality of the code listing, the displayed information comprising at least one of information concerning presence of the concept in the code listing and information concerning absence of the concept in the code listing.

16. The apparatus of claim 15, wherein those instructions that cause the processing device to receive the concept specification information are further operative to receive an indication of an abstraction level applicable to the concept.

17. The apparatus of claim 15, wherein those instructions that cause the processing device to receive the concept specification information are further operative to receive conditional property-value information applicable to each of the at least one token.

* * * * *